(12) United States Patent
Knox

(10) Patent No.: US 8,932,165 B2
(45) Date of Patent: Jan. 13, 2015

(54) TOOTHED POWER TRANSMISSION BELT

(75) Inventor: John Graeme Knox, Rochester, MI (US)

(73) Assignee: The Gates Corporation, Denver, CO (US)

( * ) Notice: Subject to any disclaimer, the term of this patent is extended or adjusted under 35 U.S.C. 154(b) by 1800 days.

(21) Appl. No.: 11/394,838

(22) Filed: Mar. 31, 2006

(65) Prior Publication Data

US 2007/0232429 A1    Oct. 4, 2007

(51) Int. Cl.
*F16G 1/28*    (2006.01)
*F16G 5/20*    (2006.01)

(52) U.S. Cl.
CPC ........................................ *F16G 1/28* (2013.01)
USPC ............................. 474/205; 474/204; 474/202

(58) Field of Classification Search
USPC ......... 474/260, 205, 263, 261, 202, 203, 204, 474/264, 265, 266, 267, 268
See application file for complete search history.

(56) References Cited

U.S. PATENT DOCUMENTS

| | | | | |
|---|---|---|---|---|
| 2,224,274 A | * | 12/1940 | Powers | ............................ 57/249 |
| 2,276,438 A | * | 3/1942 | Van Buren et al. | .............. 451/32 |
| 2,313,058 A | * | 3/1943 | Francis, Jr. | ..................... 428/196 |
| 2,507,852 A | | 12/1945 | Case | |
| 3,078,206 A | | 2/1963 | Skura | |
| 3,138,962 A | | 6/1964 | Haines, Jr. et al. | |
| 3,429,354 A | * | 2/1969 | Brooks | ......................... 152/527 |
| 3,756,091 A | | 9/1973 | Miller | |
| 3,772,929 A | | 11/1973 | Redmond, Jr. | |
| 3,964,328 A | | 6/1976 | Redmond, Jr. | |
| 4,024,895 A | * | 5/1977 | Barron | ....................... 139/426 R |
| 4,043,985 A | * | 8/1977 | Vock | ............................. 528/272 |
| 4,066,732 A | | 1/1978 | Redmond, Jr. | |
| 4,235,119 A | * | 11/1980 | Wetzel | ........................... 474/205 |
| 4,265,937 A | * | 5/1981 | Kameya et al. | ............. 427/163.4 |
| 4,266,937 A | * | 5/1981 | Takano | .......................... 474/205 |
| 4,295,837 A | * | 10/1981 | Marsh | ........................... 474/153 |
| 4,515,577 A | | 5/1985 | Cathey et al. | |
| 4,605,389 A | | 8/1986 | Westhoff | |
| 4,627,828 A | | 12/1986 | Nagai et al. | |
| 4,632,665 A | * | 12/1986 | Skura | ............................. 474/205 |
| 4,643,938 A | * | 2/1987 | Oyama et al. | ..................... 442/91 |
| 4,721,496 A | | 1/1988 | Yokoyama et al. | |
| 4,838,843 A | | 6/1989 | Westhoff | |
| 4,883,712 A | | 11/1989 | Ogawa et al. | |
| 4,968,288 A | * | 11/1990 | Lecouturier et al. | .......... 474/242 |
| 5,112,282 A | | 5/1992 | Patterson | |
| 5,178,586 A | | 1/1993 | Mizuno et al. | |

(Continued)

FOREIGN PATENT DOCUMENTS

EP    0 466 476 B1    10/1991
EP    1 616 993 A1    1/2006

(Continued)

*Primary Examiner* — Michael R Mansen
*Assistant Examiner* — Henry Liu
(74) *Attorney, Agent, or Firm* — Paul N. Dunlap, Esq.; Jeffrey A. Thurnau, Esq.

(57) ABSTRACT

A toothed belt includes a body, at least one tooth formed of the body, a jacket disposed along a peripheral surface of the at least one tooth and having a compressed thickness in the range from 0.5 mm to about 0.8 mm, and at least one cord embedded in the body and having a diameter. The at least one cord and said jacket have a ratio of said cord diameter to said jacket thickness of less than 1.8, and said cord diameter and said jacket thickness describe an optical belt PLD of about 1.2 mm or less.

24 Claims, 3 Drawing Sheets

(56) References Cited

U.S. PATENT DOCUMENTS

| | | | |
|---|---|---|---|
| 5,209,961 A * | 5/1993 | Yokoi | 428/161 |
| 5,224,905 A * | 7/1993 | Mishima | 474/258 |
| 5,531,649 A | 7/1996 | Osako et al. | |
| 5,536,213 A | 7/1996 | Macchiarulo et al. | |
| 5,807,194 A | 9/1998 | Knutson et al. | |
| 5,971,879 A | 10/1999 | Westhoff | |
| 6,007,897 A | 12/1999 | Tamaki et al. | |
| RE36,870 E * | 9/2000 | Isshiki et al. | 474/268 |
| 6,220,983 B1 * | 4/2001 | Osako et al. | 474/260 |
| 6,485,384 B1 * | 11/2002 | Ochiai et al. | 474/205 |
| 6,500,531 B2 | 12/2002 | Manabe et al. | |
| 6,539,698 B2 * | 4/2003 | Fidan et al. | 57/6 |
| 6,664,325 B1 * | 12/2003 | Nakamura | 524/510 |
| 6,824,871 B2 | 11/2004 | Chu | |
| 7,235,028 B2 * | 6/2007 | Martin et al. | 474/264 |
| 2002/0132692 A1 * | 9/2002 | Knutson | 474/263 |
| 2002/0187869 A1 * | 12/2002 | Martin et al. | 474/260 |
| 2004/0226641 A1 | 11/2004 | Akiyama et al. | |
| 2007/0144134 A1 * | 6/2007 | Kajihara | 57/229 |

FOREIGN PATENT DOCUMENTS

| | | |
|---|---|---|
| JP | 04331844 | 11/1992 |
| JP | 10-299836 A | 11/1998 |
| WO | WO9602584 A1 | 7/1995 |
| WO | 2004/057209 | 7/2004 |
| WO | WO2005/080820 A1 | 9/2004 |

* cited by examiner

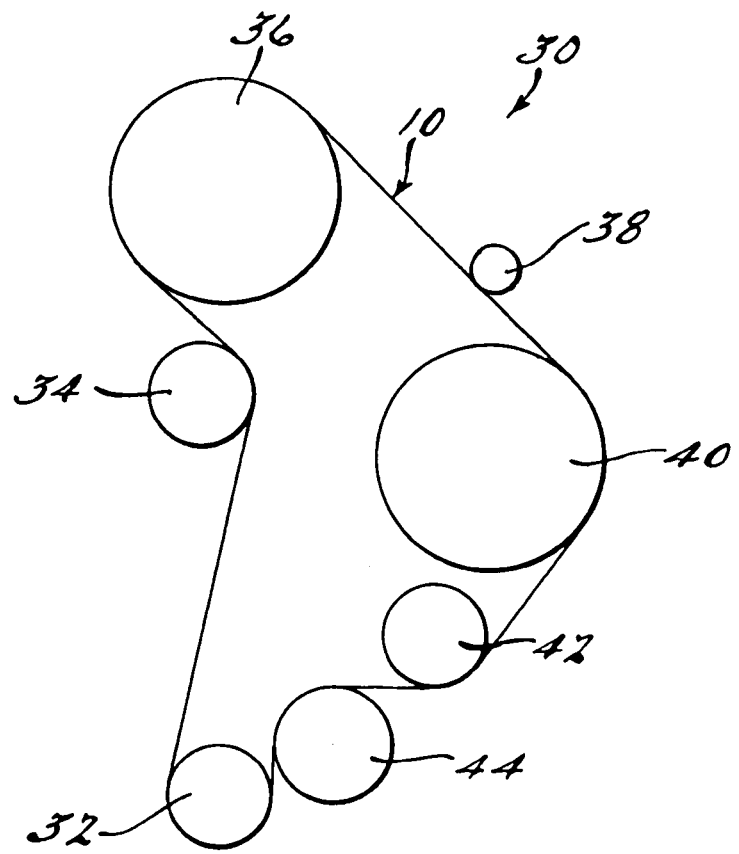

TOOTHED POWER TRANSMISSION BELT

BACKGROUND OF THE INVENTION

1. Field of the Invention

The present invention relates generally to toothed belts and, more specifically, to a relatively thick jacket, thin cord, toothed belt.

2. Description of the Related Art

It is known to provide a toothed belt for an engine such as a synchronous belt that transmits load and motion by the action of molded teeth in grooves in a pulley for the engine. Typically, the toothed belt includes a belt body, a jacket disposed along at least one toothed peripheral surface of the belt body, and a tensile member embedded in the belt body. The belt body has a plurality of belt teeth formed of the body and spaced apart at a predetermined pitch. The tensile member is comprised of one or more cords embedded in the belt body.

It is also known that the toothed belt and pulley have certain geometrical relationships. For example, as illustrated in FIG. 1, a pulley 6 has an outside diameter (OD) and a pitch diameter (PD) describing a circular pitch (CP) or tooth repeat distance, relative to the center (C) of the pulley 6. A belt 8 has a belt pitch line (BPL) or neutral axis also describing a CP. The CP of the belt must match the CP of the pulley for proper engagement or fit. The pulley 6 has a pitch line differential (PLD) that is half the difference between the PD of the pulley 6 and the OD of the pulley 6. The belt 8 has a PLD that is equal to the distance between the BPL and a belt land. The land is the bottom surface of the groove between adjacent longitudinally spaced teeth of the belt and is indicated by reference numeral 20 in FIG. 3. Typically, a center or neutral axis of the tensile member lies, or is assumed to lie, along the BPL of the belt.

It is further known that engine designers maintain standard PLD and pitch line differentials in the design of the engine. Exemplary standards include SAE J1278 and ISO 9010 for automotive under-hood synchronous drives and RMA IP-24 and ISO 5296-1 for industrial synchronous drives. The PLD and pitch are critical dimensions that insure a sufficient engagement between the teeth of the belt and the cooperating pulley. As a result, belts designed for existing engines conventionally have to incorporate a standard PLD. It is general practice to design the PLD of the belt to match that of the pulley system, so that BPL and PD coincide as shown in FIG. 1, within practical tolerances. The pitch of the belt is generally controlled by properly selecting the mold dimensions. The PLD of the belt is generally controlled by the dimensions and properties of the tensile member and jacket. Nevertheless, some engine designers have designed belt drive systems incorporating various pulleys that do not match each other and/or that have non-standard PLD, thus placing severe stresses on the belt.

Moreover, automotive designers are demanding that overhead cam belt systems also drive additional components such as water pumps, fuel pumps, and the like placing increasingly severe loads on the belt. Previously, to boost the load carrying capability of a synchronous belt, a physical property of the elastomeric compound for the belt body was changed, generally reducing belt flexibility. Alternately, or in addition, changes in jacket and/or tensile member construction or use of newer, high-performance fiber materials have been investigated. However, a change in the dimensions of the tensile member or jacket to allow more flexibility and/or load capacity in the belt will result in a change in the PLD, with the potential of adversely affecting pitch fit. Thus, although changes to the tensile member or jacket could also favorably affect load capacity, the aforementioned geometrical restrictions have placed rather tight limitations on the practical extent of such changes The interaction between the belt body, the tensile member, and the jacket is therefore important for the belt geometry, operation in a given drive system, and life and performance of the belt. Examples of such interaction and prior attempts to manipulate cord and jacket variables to achieve performance improvement have been disclosed. In U.S. Pat. No. 4,721,496 to Yokoyama et al., a very narrow range of fiberglass cord diameter, 0.9 to 1.1 millimeters (mm), combined with a cord diameter to jacket thickness ratio in the range from 1.8 to 5.0, was disclosed. In U.S. Pat. No. 5,531,649 to Osako et al., belts with an above-nominal PLD of between 0.73 and 0.85 mm, combined with a jacket thickness of between 0.3 and 0.5 mm, with glass or aramid cord, were disclosed. In U.S. Pat. No. 5,209,961 to Yokoi, belts with glass cord diameters of 0.63 mm to 0.85 mm, combined with a cord diameter to jacket thickness ratio in the range from about 1.5 to 2.2, were disclosed. Thus, changes in one of these components may not be facilitated unless consideration is made for the other components. Yet, performance of belts designed within these conventional parameter ranges have failed to meet desired performance standards, and in some cases, have failed to achieve even the minimum expected potential of newer, high-performance materials such as carbon fiber. As such, it is desired to focus on changes of the tensile member and jacket, which complement one another to achieve a desired belt geometry and improvement in performance.

Therefore, it is desirable to provide a new belt construction for a synchronous belt that focuses on the tensile member and jacket to achieve a desired belt geometry and improvement in performance, including improved load capacity and flexibility. It is also desired to provide a new belt construction for a synchronous belt that uses smaller diameter cords for the tensile member. It is further desirable to provide a new belt design approach that results in improved performance from high-strength, high-modulus cord materials. It is further desirable to provide a new belt construction that functions properly in a variety of pulleys within a predetermined pitch line differential range. Therefore, there is a need in the art to provide a toothed belt that meets at least one of these desires.

SUMMARY OF THE INVENTION

Accordingly, one embodiment of the present invention is a relatively thick jacket, thin cord, toothed belt suitable for an automotive synchronous drive. The toothed belt includes an elastomeric belt body, at least one tooth formed of the belt body, a jacket disposed along a peripheral surface of the belt body, and a tensile member or cord embedded in the belt body. The jacket has a compressed thickness of 0.5 mm to about 0.8 mm, and the ratio of the cord diameter to the jacket thickness is less than 1.8, and the pitch line differential of the belt is no more than about 1.2 mm.

An aspect of the invention is the selection of cord fiber material from the group carbon, PBO, aramid, glass, and a hybrid of two or more of the foregoing. The cord may be carbon fiber and of cord diameter from about 0.5 mm to about 0.95 mm. The jacket may have a compressed gauge thickness of about 0.57 mm to about 0.75 mm.

In another embodiment, the invention is a synchronous drive assembly comprising at least a driver and a driven pulley having a predetermined design PLD, and a toothed belt in driving engagement with said pulleys. The toothed belt comprises an elastomeric belt body; a tensile cord having a diameter; a jacket having a compressed thickness; and a belt optical PLD. The ratio of the belt PLD to the design PLD is in the range of from about 1.2 to about 1.75; and the ratio of the cord diameter to the jacket thickness is in the range of from about 0.7 to about 1.7. The cord may be carbon fiber of filament count from about 1K to about 48K.

One advantage of the present invention is that a thick jacket, thin cord, toothed belt is provided for a vehicle. Another advantage of the present invention is that the toothed belt incorporates a new tensile member made from a 6K tow of fiber for the cords thereof to increase a flexibility of the belt. Yet another advantage of the present invention is that the toothed belt has a thick jacket, which is a "stiff jacket", to increase a tooth load carrying capacity of the belt. Still another advantage of the present invention is that the toothed belt has a thick jacket coupled to a small diameter cord that improves the load carrying capability of the belt construction together with other belt performance characteristics. A further advantage of the present invention is that the toothed belt functions properly in pulleys of a standard PLD or a range of PLD. Yet a further advantage of the present invention is that the toothed belt improves the potential service life of an engine because a fabric for a thick jacket thereof will not wear out as quickly as a thin jacket. Still a further advantage of the present invention is that the toothed belt allows for the use of a small diameter "high flex", such as 6K carbon fiber cord, for example when "thin cords" are required for "high flex" drives. Another advantage of the present invention is that the toothed belt has a small diameter highly flexible cord that reduces belt running temperature, thereby reducing the onset of compound thermal degradation (i.e., compound aging). Yet another advantage of the present invention is that the toothed belt has a 6K yarn that is not subject to tensile degradation as a function of hours or cycles on motored engines, thereby increasing the life of the belt. Still another advantage of the present invention is that the toothed belt includes a tensile member having a cord with a physical geometry that is small in diameter and a jacket that is great in thickness when compared to current belt constructions.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 4 is a fragmentary view of a section of the toothed belt of FIG. 2.

FIG. 5 is a diagrammatic view of a test configuration utilized to characterize an aspect of the present invention.

DETAILED DESCRIPTION OF THE INVENTION

Figure 2:
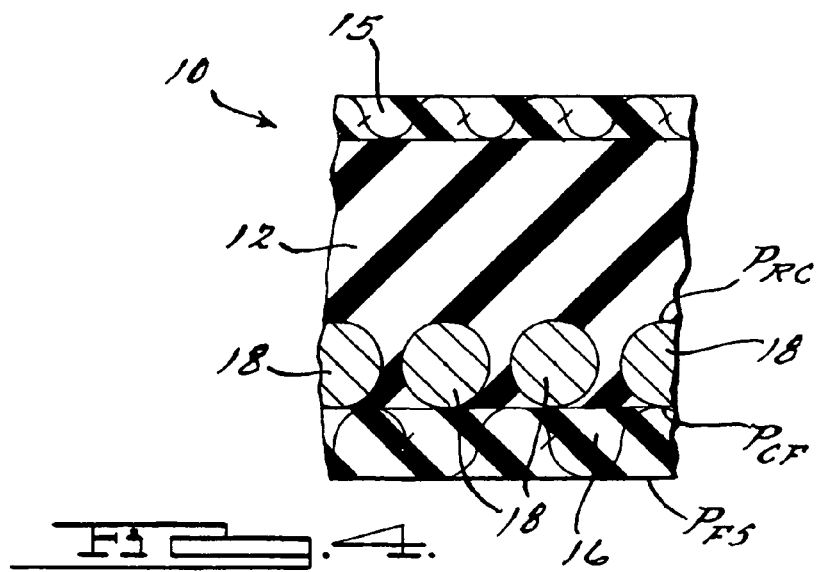
FIG. 2 is a perspective view of a thick jacket, thin cord, toothed belt, according to the present invention.
Figure 3:
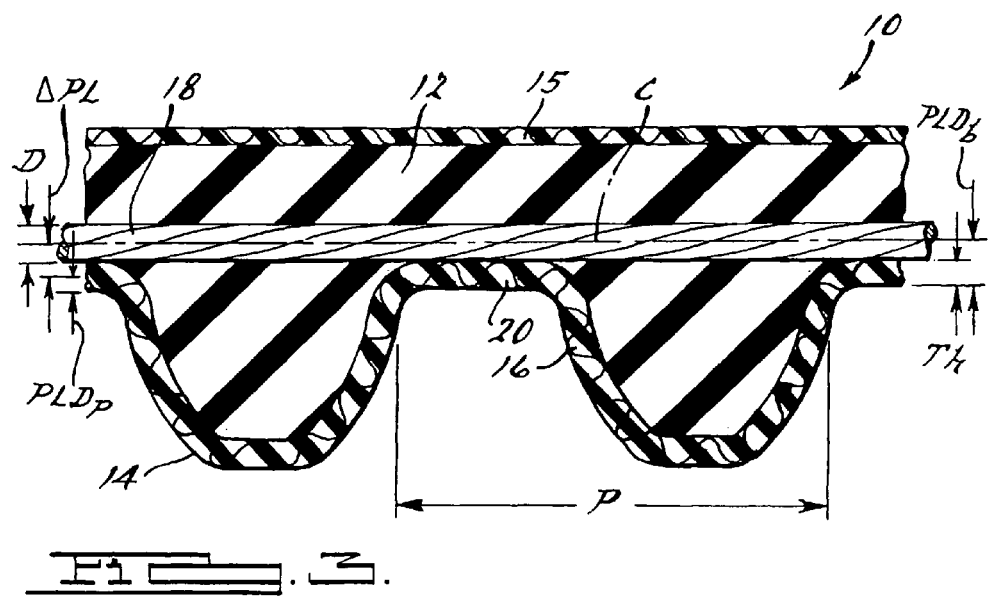
FIG. 3 is a fragmentary view of the toothed belt of FIG. 2.
Figure 2:
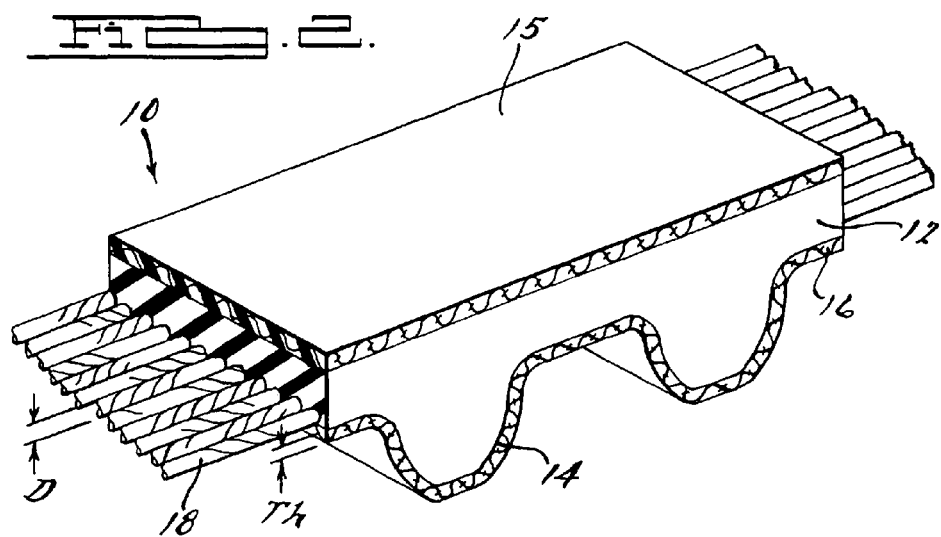

Referring to the drawings and in particular FIGS. 2 and 3, one embodiment of a thick jacket, thin cord, toothed belt 10, according to the present invention, is shown. The toothed belt 10 includes a belt body 12 formed of any suitable cured elastomer composition. The belt body 12 includes at least one, preferably a plurality of belt teeth 14 formed of the belt body 12 and spaced apart at a predetermined tooth pitch (P).

For utilization in the belt body elastomer composition, any suitable and/or conventional elastomer type may be employed, including both castable and non-castable elastomers and also thermoplastic elastomers. As thermoplastic elastomers, thermoplastic polyurethane ("TPU") may beneficially be employed. As non-castable elastomers, chloroprene rubber ("CR"), acrylonitrile butadiene rubber ("NBR"), hydrogenated NBR ("HNBR"), styrene-butadiene rubber ("SBR"), alkylated chlorosulfonated polyethylene ("ACSM"), epichlorohydrin, butadiene rubber ("BR"), natural rubber ("NR") and ethylene alpha olefin elastomers such as ethylene propylene terpolymer ("EPDM") and ethylene propylene copolymer ("EPM"), or a combination of any two or more of the foregoing may beneficially be employed.

As castable elastomers suitable for use as the belt body elastomer of the belts in accordance with the present invention, urethanes, polyurethanes, urethane/ureas, and ureas are mentioned as non-limiting examples. For castable elastomers, the belt body 12 is cast of a liquid belt material that, when cured, has the requisite physical characteristics required of a power transmission belt. For example, the material may have the properties as disclosed in any of U.S. Pat. No. 4,838,843 to Westhoff, U.S. Pat. No. 5,112,282 to Patterson et al., or in WOP Publication No. 96/02584 (Feb. 1, 1996) to Wu et al.

Conventional elastomer composition additives including fillers, short fibers, curatives, activators, accelerators, scorch retarders, stabilizers, antioxidants, antiozonants, and plasticizers may be utilized in conjunction with the elastomer constituent itself to form the belt body portions, in amounts conventionally employed for this purpose. The belts of the present invention, which may be toothed as illustrated in FIGS. 2 and 3, may be fabricated using known belt-building techniques, any number of which would be readily appreciated by one skilled in the relevant art. Examples of power transmission belts, namely toothed or synchronous belts, are disclosed in U.S. Pat. Nos. 2,507,852 and 3,138,962. Examples of methods for producing such belts are disclosed in U.S. Pat. Nos. 3,078,206, 3,772,929 and 4,066,732. It should be appreciated that these patent references are merely examples of various types of toothed power transmission belts and state-of-the-art formation techniques thereof.

The belt teeth 14 formed of the belt body 12 may have any desired cross-sectional shape such as trapezoidal, curvilinear, or curvilinear truncated. Examples of curvilinear tooth shapes appear in U.S. Pat. No. 3,756,091 to Miller, U.S. Pat. No. 4,515,577 to Cathey et al., and U.S. Pat. No. 4,605,389 to Westhoff. It should be appreciated that the belt teeth 14 are spaced from each other by a predetermined pitch (P).

The toothed belt 10 also includes an optional jacket 15 to cover the back of the belt body 12. The back of the belt may optionally be without a jacket and/or ground smooth or given a corrugated pattern. The belt may be a double sided synchronous belt, with teeth on both sides, to which all geometrical and material considerations with respect to the single-sided belt would optionally apply doubly. The belt teeth 14 are covered with the jacket 16 as shown, disposed along peripheral surfaces of the belt teeth 14. The jacket 16 is made of a wear-resistant fabric for promoting tooth sheer strength and, in castable belt constructions in particular, for reducing aggressiveness of the belt teeth 14 when entering grooves of a sprocket or pulley. The jacket 16 is relatively thick. The jacket 16 has a compressed gauge thickness (Th). It should be appreciated that the compressed jacket thickness is the thickness of the jacket, after belt manufacture, when the jacket is part of the belt structure, compressed in the belt.

Any suitable or conventional material may be employed for the jacket 16, including crimped nylon, woven nylon, cotton, hemp, jute, aramid, polyester, polytetrafluoroethylene (PTFE), and fiberglass. The fabric may be woven, double-woven, knit, or non-woven. More than one ply of fabric may be employed, or more than one type of fabric may be combined in multiple layers to achieve the desired total thickness. Examples of such combinations are disclosed in U.S. Pat. No. 5,971,879 to Westhoff. If desired, the fabric may be cut on a bias so that the strands form an angle with the direction of travel of the toothed belt 10. The fabric may be of any desired configuration such as a conventional weave consisting of warp and weft threads at any desired angle, or may consist of pick cords, or of a knitted or braided configuration or the like. It should be appreciated that a plurality of transversely oriented grooves (not shown) may optionally be formed in an outer layer or back side of the toothed belt 10. It should also be appreciated that, while not necessary, the grooves reduce belt weight and may enhance belt flexibility in some applications or under certain circumstances, particularly wherein a castable material is used to form the belt body 12. The jacket fabric may be treated with a rubber composition compatible for bonding to the belt body. The treatment may be a rubber solution or RFL dip, or calendered, frictioned, or skimmed rubber, and the like. A layer of rubber may be provided on one side of the fabric as a cushion layer between fabric and cord. The fabric may have a thermoplastic film laminated to one side as disclosed in U.S. Pat. No. 3,964,328.

In one embodiment particularly suited for automotive applications with system design PLD of about 0.686 mm or with actual pulley PLD ranging from about 0.6 mm to about 0.8 mm, the jacket thickness (Th) is in a range from about 0.5 mm to about 0.8 mm, and the ratio of cord diameter to jacket thickness is less than 1.8, and the belt PLD is no more than about 1.2 mm. An exemplary jacket 16 comprises Nylon 6-6 texturized yarns woven in a twill pattern with a fabric weight of between about 500 to about 700 grams per square meter (gsm), preferably a weight of between about 550 gsm to about 650 gsm. In this embodiment, the jacket 16 has a greige fabric original gauge thickness of about 1.83 mm and a treated fabric/original jacket gauge thickness of about 2.1 mm before being compressed to the compressed gauge thickness (Th). Thus, when combined in this embodiment with a suitable cord of diameter from about 0.5 to about 0.9 mm, the ratio of the cord diameter (D) to the original jacket gauge thickness may be in the range from about 0.24 to about 0.43, and the ratio D/Th may be in the range from about 0.7 to about 1.8. Preferably the cord diameter may be in a range from about 0.6 to about 0.85 mm. A suitable cord comprises 6K carbon fiber and has a diameter of about 0.7 to about 0.8 mm.

The toothed belt 10 includes a tensile member 18 embedded in the belt body 12. The tensile member 18 includes at least one, preferably a plurality of helically spiraled cords embedded in the belt body 12. In this embodiment, the tensile member 18 in the form of a cord is helically spiraled across the width of the toothed belt 10 as a matched pair of S and Z twisted cord in spaced side-by-side fashion according to common practice in the art. The cord in non-limiting embodiments of the present invention may thus occupy from about fifty-six percent (56%) to about ninety-five percent (95%) of the belt width, and preferably from about sixty-five percent (65%) to about ninety-two percent (92%) of the belt width.

The cord of the tensile member 18 comprises a plurality of twisted and/or bundled yarns at least one of which comprises a yarn of fibers. In the present context and throughout the present application, the terms "fiber" and "filament" are utilized interchangeably to designate a material having a small cross-sectional diameter, e.g., 4-9 µm, and a length at least about one hundred times its diameter, but generally having an exceedingly great or even indefinite length, and which forms the basic element of a yarn. The term "yarn" is utilized herein and throughout the present application to designate at least two, but generally with regard to fiber yarns, one thousand or more fibers that are laid and/or twisted and/or otherwise bundled together in a continuous strand to form a component of a cord. The term "cord" is utilized throughout the present application to designate the product of one or more yarns that may be twisted as is known in the art, and where two or more yarns are employed, may moreover be laid and/or bundled and/or twisted together and/or treated with an adhesive treatment.

The fibers are high strength, high modulus fibers. The fibers may be made, for example, of fiberglass, aramid, poly (p-phenylene-2,6-benzobisoxazole) (PBO), carbon, or hybrid combinations thereof. Preferably, the fibers are carbon fibers. Exemplary carbon fibers for utilization in the practice of an embodiment of the present invention are described for example in aforementioned U.S. Pat. No. 5,807,194, the contents of which, with regard to illustrative carbon fiber types, configurations, and designations that may be utilized in the practice of embodiments of the present invention, are incorporated herein by reference. Carbon fiber is generally made by carbonizing an organic fiber such as polyacrylonitrile (PAN), rayon, or pitch fiber wherein in the carbonizing process the diameter of the fiber is substantially reduced. Yarns formed from one or more carbon fibers typically have a mass per unit length of from about 66 tex to about 1,650 tex, and a filament count (i.e., number of individual carbon fibers per yarn) of from about 1,000 to about 54,000. The carbon fiber for use in accordance with the present invention possesses a tensile modulus in the range of from about 50 GPa to about 600 GPa; preferably of from about 100 GPa to about 300 GPa; and most preferably of from about 150 GPa to about 275 GPa, as determined in accordance with ASTM D4018. In embodiments of the present invention wherein the cross-sectional diameter of the individual carbon fibers is in the range of from about 5 µm to about 9 µm, the filament count of the cord utilized in the automotive power transmission application mentioned above may be from about 3,000 to about 12,000, preferably about 6,000. As is well known in the art, carbon yarn and cord formed therefrom may be characterized by the number of fibers contained therein rather than by denier or decitex. A nomenclature of numbers and the letter "KK" are used to denote the number of carbon fibers in a yarn. Thus, in a "3K" carbon fiber yarn, the "K" is an abbreviated designation for "1,000 fibers", and the "3" designates a multiplier. Thus "3K" carbon yarn identifies a yarn of 3,000 fibers or filaments. Moreover with regard to cord nomenclature, in a "3K-2" carbon fiber cord for example, the "2" indicates that two 3K yarns are twisted and/or otherwise bundled together to thus form a cord having a filament count of 6,000.

The carbon fiber cord comprises any combination of yarns suitable for a given application, including but not limited to 1K-1, 3K-1, 3K-2, 6K-1 . . . 6K-9, 12K-1 . . . 12K-4, 18K-1 . . . 18K-3, 24K-1, 24K-2, 48K-1, and the like, which provide a cord with a diameter (D) determined by the design method to be discussed below. Non-limiting examples of carbon fibers suitable for use in practicing the present invention are made available commercially by Toray Industries, Inc., under the references TORAYCA-T400 HB 6K 40D and TORAYCA-T700 GC 6K; similar materials are also available commercially through Toho Tenax Co., Ltd., under the references UT500-6k; and similar materials are further available commercially through Cytec Industries, Inc., under the references T-650/35 6K 309NT. Suitable glass fibers include E-glass, or preferably high-strength glass such as S-glass, R-glass or U-glass. Non-limiting examples of glass fibers suitable for use in practicing the present invention are made available commercially by AGY of Aiken, South Carolina, under the reference 762 S-2 Glass. Non-limiting examples of aramid fibers suitable for use in practicing the present invention are made available commercially by Dupont Chemical Company under the references Kevlar™ and Nomex™ and by Teijin Techno Products Limited under the references Technora™, Twaron™, and Teijinconex™. Non-limiting examples of PBO fibers suitable for use in practicing the present invention are made available commercially by Toyobo Co., Ltd., under the reference Zylon™.

In addition, the cord may have a hybrid cord construction. For example, the cord may have a carbon fiber (6K) center core with fiberglass or aramid yarn wrapped around the outside of the center core. In a hybrid cord construction suitable for the aforementioned automotive application, the center core has a diameter (D) of less than 0.8 mm. Preferably, the core has a diameter (D) between about 0.55 mm and about 0.8 mm. It should be appreciated that the carbon fiber bundle is the main load carrying component.

Fiber manufacturers typically coat fibers with a sizing, which generally serves to inhibit fracturing as the fiber is processed into yarns and wound onto spools, and/or to facilitate wetting of the fibers and yarns formed therefrom with cord treatment(s). In some instances, the sizing may thus have a chemical structure that is compatible with a cord treatment applied to the yarns and/or filaments for incorporation of treated cord into a power transmission belt, and may for example thus be a water- or solvent-based epoxy solution. Throughout the present application, the term, "sizing" is used to denote a generally thin film applied to a yarn and/or yarn filament at a level of from about 0.2 to 2.0% dry weight, i.e., based on the weight of the dried, so treated yarn or filament, i.e., the dried yarn or filament to which the sizing had been applied, in order to function as hereinabove described.

In accordance with an embodiment of the present invention, an RFL composition, i.e., an elastomer latex composition further comprising a resorcinol-formaldehyde reaction product, may be applied as a cord treatment to at least a portion of the yarn and/or one or more of its carbon filaments. Throughout the present application, the term, "cord treatment" is used to denote a material applied to a yarn and/or yarn filament (which may or may not include a sizing) and located at least on a portion of the yarn- and/or yarn filament surface and within at least a portion of one or more interstices formed between such filaments and yarn(s) of a cord formed through the bundling and/or twisting and/or other combination or configuration of such cord-treated yarn; and being applied to such yarn and/or yarn filament at a level greater than two percent (2.0%) based on the final weight of the so treated cord.

As the RFL constituents, any suitable materials may be employed. The resorcinol-formaldehyde resin fraction in the RFL solution preferably represents from about 2 to about 40% by weight dry basis, with the latex fraction representing from about sixty percent (60%) to about ninety-eight percent (98%). Preferably, the resorcinol-formaldehyde resin fraction represents from about five percent (5%) to about thirty percent (30%) by weight dry basis, and the. latex fraction represents from seventy percent (70%) to about ninety-five percent (95%). This proportion in an embodiment of the present invention has been found to allow for the various filaments of the carbon fiber to be impregnated sufficiently to reduce abrasion and breaking thereof, while maintaining sufficient flexibility necessary to accomplish the twisting and cabling operations conventionally employed. Irrespective of the particular fractions of resorcinol-formaldehyde resin and latex employed or the pick-up level achieved however, it has been found in the practice of the present invention that the solids level of the cord treatment solution should be brought to and maintained at a point wherein the RFL solution remains substantially stable during the treatment process.

The latex component in the RFL solution may be of any suitable type, including HNBR, NBR, carboxylated HNBR, carboxylated NBR, vinyl pyridine/styrene butadiene rubber ("VP/SBR"), carboxylated VP/SBR, SBR, hydrogenated SBR, chlorosulfonated polyethylene ("CSM"), ethylene alpha-olefin-type elastomer such as EPDM and EPM, or a combination of any two or more of the foregoing. In a preferred embodiment, the latex component is a carboxylated HNBR type, and may include minor to up to equal amounts or proportions by weight or more of other elastomer types, including ethylene alpha-olefin-type elastomers such as EPDM or EPM. Ethylene alpha olefin elastomer may be utilized singly or in combination of any two or more thereof to improve low temperature performance properties of the resultant belt, such as low temperature flexibility.

Other cord treatments known in the art may also suitably be used, such as the epoxy-latex/RFL two-step treatment disclosed in U.S. Pat. No. 6,500,531 for carbon fiber cord, or the similar treatment for PBO cord disclosed in U.S. Pat. No. 6,824,871, or the solvent-based epoxy-rubber/RFL treatment for carbon fiber disclosed in U.S. Pat. No. 4,883,712.

Figure 1:
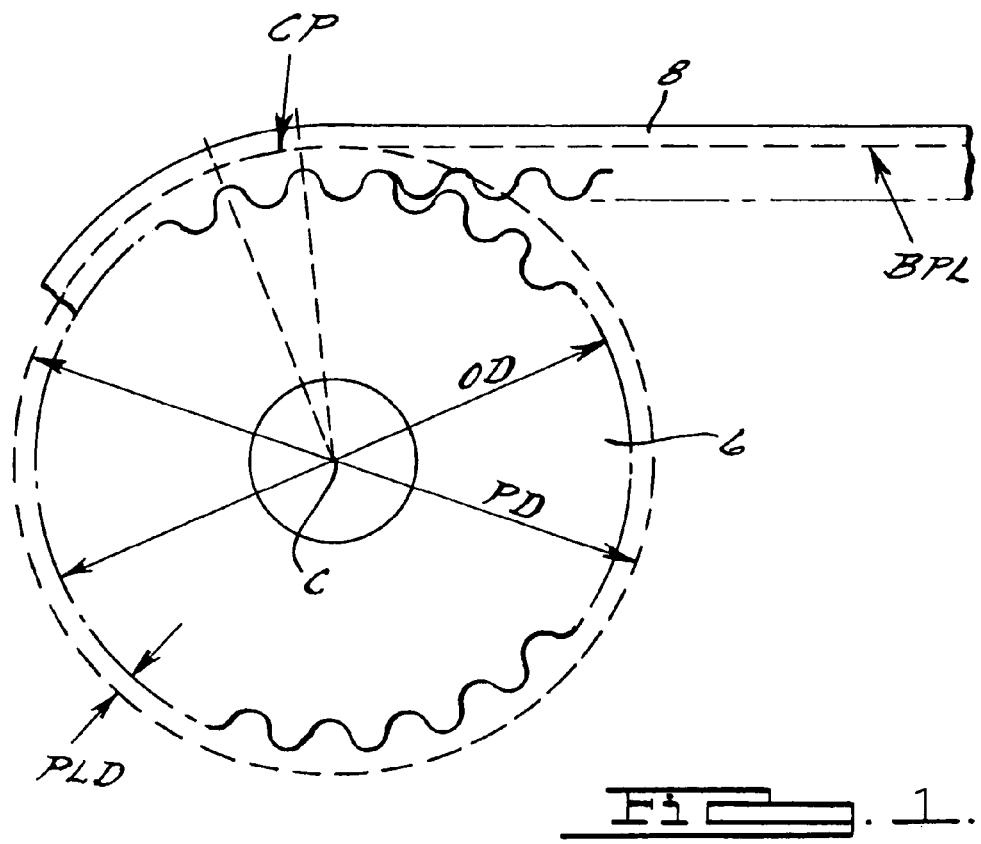
FIG. 1 is a diagrammatic view of a pulley and a toothed belt illustrating a geometrical relationship therebetween.

In embodiments of the present invention, the cord may have a diameter (D) of from about 0.2 mm to more than 2.1 mm. The following discussion addresses an embodiment belt designed to fit a standard automotive application with system design PLD of 0.686 mm (0.027 inch). For such a belt, D may range from about 0.5 mm to about 0.9 mm. Preferably, the cord has a diameter between about 0.7 mm and about 0.8 mm. A suitable cord may comprise 6K carbon fiber. The center (C) of the cord defines a neutral belt axis/pitch line as illustrated in FIG. 2. The standard design tolerance for pulley PLD is +0.05 -0.00 mm. However, in at least one known automotive example, the pulley 6 (FIG. 1) has a pitch line differential (PLD) in the wider range of about 0.648 mm (0.0255 inches) to about 0.775 mm (0.0305 inches) which causes pitch fit problems for conventional belts. The neutral belt axis of the inventive belt is located above the greatest pulley PLD. The belt has a differential pitch line ($\Delta$PL) that is the difference between the PLD or neutral axis of the belt and the design pulley PLD of 0.686 in this case. The $\Delta$PL is in a range of about 0.09 mm (0.003 inches) to about 0.5 mm (0.02 inches). Preferably, $\Delta$PL is in a range of about 0.16 mm to about 0.51 mm, or from about 0.16 mm to about 0.36 mm. It should be appreciated that the $\Delta$PL is also the difference in pitch line between the toothed belt 10 and the pulley 6. The tensile member 18 and jacket 16 described above thus together provide a belt that may have a PLD in the range of from about 0.78 mm to about 1.2 mm, or preferably in the range from 0.85 mm to about 1.2 mm or in the range from about 0.85 to about 1.1 mm. The tensile member 18 and jacket 16 described above together provide a belt that may have a D/Th in the range of from about 0.7 to about 1.8, or preferably from about 0.9 to about 1.6, or from about 1.0 to about 1.5.

As illustrated in FIG. 4, the PLD of the toothed belt 10 can be measured optically and calculated based on the jacket surface position ($P_{FS}$), the cord-fabric interface ($P_{CF}$) and the body rubber-cord interface ($P_{RC}$), all determined at a cross section of the belt through a land area (20 in FIG. 3). The average jacket thickness (Th) is equal to the absolute value of the difference between the average $P_{CF}$ and the average $P_{FS}$. The average cord diameter (D) is equal to the absolute value of the difference between the average $P_{RC}$ and the average $P_{CF}$. The optical PLD is equal to the average jacket thickness (Th) plus half of the average cord diameter (D), i.e. PLD=Th+D/2. It should be appreciated that the optical PLD of the toothed belt 10 is measured based on an average of several readings, preferably taken at one or more land 20 positions around the belt.

To design a belt suitable for a given drive system, there are five variables that must be taken into consideration. The five variables are D (diameter of the cord), Th (thickness of the jacket), PLDp (pitch line differential of the pulley or drive system), PLDb (pitch line differential of the belt which is based on the optical dimensional measurement previously described), and ΔPL (the difference in pitch line between the belt and the pulley). Alternately, PLr (pitch line or PLD ratio) may be used as the fifth design variable instead of ΔPL. The PLDp is generally given by design and is considered the design PLD of a conventional belt/drive system. Two equations are provided: (1) ΔPL=PLDb−PLDp or PLr=PLDb/PLDp, and (2) PLDb=Th+D/2. Thus, to specify the belt, two more equations or variables must be supplied by the designer. Two design approaches are practical. (1) If the variable D/Th is in a given range, and either ΔPL or PLr is also in a given range, the design method is called a "thickness ratio" approach. This design method may be considered independent of the PLDp, or applicable to any desired PLDp. (2) If D and Th are given or in given ranges, then PLDb is easily calculated, and ΔPL or PLr become dependent on the PLDp and easily calculated, and the design method is called an "actual thickness" approach. Specifying D and Th generally yields a belt suitable only for a specific PLDp. It should be appreciated that the toothed belt 10 may be designed based on these variables and by either method.

Thus, according to the actual thickness approach, by way of a design example, a preferred jacket thickness of from 0.5 to 0.7 mm and a preferred cord diameter of from 0.6 to 0.8 mm may be specified. As a result, the ratio D/Th will range from about 0.9 to about 1.6. Also as a result, the PLDb will range from about 0.8 to about 1.1 mm. It may be generally preferable to narrow the specified ranges somewhat to maintain a ratio of D/Th in the range from about 1 to about 1.5 and a PLDb in the range from 0.85 to 1.08 mm. Then, as a result, for a design PLDp of 0.686 mm, the ΔPL of the belt/pulley system will be in a preferred range of from about 0.16 to about 0.36 mm. This design example may be applicable to a belt for an automotive overhead cam drive system.

Alternatively, according to the thickness ratio design approach, by way of example, the ratio PLr may be specified to be in the range from about 1.2 to about 1.75, or from 1.24 to about 1.75, or preferably from about 1.24 to about 1.6. The ratio D/Th may be in the range from about 0.7 to about 1.8, or in a preferred range of from about 0.9 to about 1.6, or from about 1.0 to about 1.5. As a result, for a specified PLDp of, for example, 0.686 mm, the PLDb must then be in the range from about 0.83 to about 1.20 mm, or preferably from about 0.85 to about 1.2, or from about 0.85 to about 1.1. Given PLr and PLDp and D/Th, the cord diameter and jacket thickness can then be properly selected to provide PLDb. Thus, thick jacket, thin cord belts according to the present invention can be designed for any desired belt/pulley system PLD. This thickness ratio approach, applied by way of example to the standard industrial synchronous pulley sizes or "sections" listed in the standard RMA IR-24, yields the ranges for cord diameter and jacket thickness listed in Table 1. Each combination listed is a proportionately scaled embodiment of the inventive thick jacket, thin cord, toothed belt using the narrowest ranges listed above for PLr and D/Th. It should be appreciated that the industrial H section belt is equivalent in PLD to the most common automotive PLD, 0.686 mm. By way of example, a carbon fiber cord construction approximating a nominal diameter in the desired range is listed for each belt section in Table 1. It should be understood that suitable cords of each desired diameter range may be constructed from aramid, glass, PBO or other suitable high strength, high modulus fibers. It should also be understood that the same design approach can be applied to metric belt sizes such as 2-mm, 3-mm, 5-mm, 8-mm and 14-mm pitches and the like, and for any desired tooth profile.

TABLE 1

| Belt Section | PLDp (mm) | PLDb-range (mm) | Carbon Fiber Cord | Nominal D (mm) | D-range (mm) | Th-range (mm) |
|---|---|---|---|---|---|---|
| MXL, XL | 0.254 | 0.32-0.41 | 1k | 0.29 | 0.21-0.35 | 0.18-0.27 |
| L | 0.381 | 0.47-0.61 | 3k | 0.5 | 0.31-0.52 | 0.27-0.41 |
| H | 0.686 | 0.85-1.1 | 6k or 12k | 0.75 or 0.95 | 0.57-0.95 | 0.49-0.73 |
| XH | 1.397 | 1.73-2.24 | 18k or 24k | 1.24 or 1.45 | 1.15-1.92 | 1.0-1.5 |
| XXH | 1.524 | 1.89-2.44 | 24k | 1.45 | 1.26-2.1 | 1.1-1.6 |

The toothed belt 10 fits the pulley PLD of existing engines but is significantly altered from conventional belt design by decreasing the diameter of the tensile member 18 and more than proportionately increasing the thickness of the jacket 16. The smaller diameter tensile member 18 takes less energy to bend, which reduces the generation of heat, in turn, reducing the running temperature of the toothed belt 10, thereby reducing the aging of the compound for the body 12. The use of high-strength, high-modulus fibers such as carbon fibers for the tensile member 18 maintains tensile strength of the toothed belt 10. The thick jacket 16 boosts the load capacity of the belt teeth 14 while using standard elastomer compounds. As a result, the toothed belt 10 lasts longer with abrasion because it takes longer to wear through the thicker jacket 16. It should be appreciated that a larger diameter tensile member takes more energy to bend, resulting in the generation of heat and quicker aging of the body compound.

The toothed belt 10 has a cord to fabric ratio that maintains the desired ΔPL or PLr rather than the conventional approach of matching the pulley PLD within relatively tight tolerances. For example, an inventive toothed belt having a tensile member of 6K carbon fiber yarn and a relatively thick jacket is compared to conventional toothed belts having tensile members of glass fiber yarn and of 12 k carbon fiber as illustrated in Table 2 as follows:

TABLE 2

| Construction | Cord D (mm) | Jacket gauge (mm) | Ratio | Compressed gauge Th (mm) | Ratio D/Th | PLDb (mm) |
|---|---|---|---|---|---|---|
| Comparative Std. Glass | 1.0 | 1.6 | 0.63 | 0.2-0.3 | 4 | 0.75 |
| Comparative Carbon 12K | 0.95 | 1.6 | 0.59 | 0.2-0.3 | 4 | 0.73 |
| Inventive Carbon 6K | 0.75 | 2.1 | 0.36 | 0.5-0.7 | 1.25 | 0.98 |

This comparison indicates that the inventive toothed belt 10 having a tensile member of 6K carbon fiber yarns has a lower ratio of cord diameter to jacket thickness and a higher belt PLD than conventional belts. Thus, the toothed belt 10 having a tensile member of 6K carbon fiber yarns has lower initial tensile strength but a high flex cord that reduces belt running temperature.

To illustrate the effects of the present invention, toothed belts were formed using tensile members formed of standard glass yarns, 12K carbon fiber yarns, and 6K carbon fiber yarns. The belts differed only in jacket thickness and cord material. Each of the belts had a 25 mm top width and 141 teeth (9.525 mm pitch) and measured about 1343.025 mm in length. The teeth were curvilinear. To maintain the standard automotive tooth pitch and fit pulleys with a 9.525 mm pitch at nominal belt length, the mold for the inventive belt only was cut to have a PLD of 0.94 mm. In each of the following examples set forth in Table 3, each belt had an original belt tensile strength and were tested for a number of hours to a final belt tensile strength:

TABLE 3

| Belt (Identification) | Belt Tensile Strength Original (kN/20 mm) | Test time(s) (Hrs) | Belt Tensile Strength Final (kN/20 mm) |
|---|---|---|---|
| Comparative Std Glass | 37 | 330 ave | All Tensile failure |
| Comparative 12K Carbon | 34 | 792/803 | Complete belt failure |
| Inventive 6K Carbon | 25 | 1362/1574/ 1999 | 21.9/21.5/ 21.2 |

The three different cord material belts as described above for each of the examples set forth in Table 3 were built using cord-jacket combinations as set forth in Table 2 and tested on a test rig 30 as illustrated in FIG. 5. The test rig 30 was built to simulate the timing belts used on a 1900 cc, four-cylinder, direct-injection, diesel engine. The test rig 30 includes seven pulleys 32, 34, 36, 38, 40, 42, and 44 as shown in the schematic depiction provided in FIG. 4. The pulley 32 represented a driver or crankshaft pulley, the pulley 34 represented a tensioner pulley, the pulley 36 represented a camshaft pulley, the pulley 38 represented an idler pulley, the pulley 40 represented a fuel injector pump pulley, the pulley 42 represented a water pump pulley, and the pulley 44 represented an idler pulley. The pulley 32, pulley 36, pulley 40, and pulley 42 each possessed sprocket grooves (22, 44, 44, and 19 in number, respectively) for meshing with the belt teeth, at a 9.525 mm pitch, but with different PLDp (0.648 mm, 0.749 mm, 0.749 mm, and 0.775 mm, respectively). The pulleys 38 and 44 were plain, i.e., non-toothed pulleys, measuring 28 mm and 80 mm in diameter, respectively, and auto-tensioner pulley 34 was plain and measured 67 mm in diameter. A test apparatus included a chamber containing the test rig 30 and within which the temperature was held at 120° C. throughout the test.

The belts were operated on the test rig 30 in a clockwise direction under a "4-mm" load, which represents maximum load or displacement of the fuel injector pump, at 4000 RPM applied by electric motor at the crankshaft or driver pulley 32, with an installation tension of 500 N imposed by the automatic mechanical tensioner 34, and with a peak tight side tension caused by the fuel injector pump of 2,500 N, as measured by strain gauges in pulley 34. The belt was tested until either failure or a final belt tensile was achieved. These results indicate that three comparative toothed belts having a tensile member formed of standard glass fiber yarn all had tensile failures at approximately 330 hours, and two comparative toothed belts having a tensile member formed of 12K carbon fiber yarn had a complete belt failure at 792 and 803 hours, respectively. On the other hand, three inventive toothed belts having a tensile member formed of 6K carbon fiber yarn were tested for 1362, 1574, and 1999 hours, respectively, and had a final belt tensile of 21.9, 21.5, and 21.2 kN/20 mm, respectively. The inventive belts exhibited signs of normal wear failure, including jacket wear in the land areas and on tooth flanks. Therefore, the toothed belt 10 having a relatively thick jacket and thin cord of 6K carbon had a lower initial tensile strength, but a much longer life, and a more desirable mode of failure.

Accordingly, the toothed belt 10 of the present invention has a small diameter cord with a thick fabric/jacket to maintain a belt PLD much greater than the pulley PLD. The toothed belt 10 has lower initial tensile strength and a high flex cord that reduces belt running temperature. The toothed belt 10 has a high gauge fabric that improves tooth loading capability and tooth and land wear resistance.

The present invention has been described in an illustrative manner. It is to be understood that the terminology, which has been used, is intended to be in the nature of words of description rather than of limitation. Many modifications and variations of the present invention are possible in light of the above teachings. Therefore, within the scope of the appended claims, the present invention may be practiced other than as specifically described. The invention disclosed herein may suitably be practiced in the absence of any element that is not specifically disclosed herein.

What is claimed is:

1. A toothed belt comprising:
an elastomeric body;
at least one tooth formed of said body;
a jacket comprising fabric and disposed along a peripheral surface of said at least one tooth and having a compressed jacket thickness in the range from 0.5 mm to about 0.8 mm;
at least one cord embedded in said body and having a cord diameter;
said at least one cord and said jacket having a ratio of said cord diameter to said jacket thickness of less than 1.8;
and said cord diameter and said jacket thickness describing an optical belt pitch line differential of about 1.2 mm or less.

2. A toothed belt as set forth in claim 1 wherein said at least one cord is made of a fiber material selected from carbon, poly(p-phenylene-2,6-benzobisoxazole), and a hybrid of at least two selected from carbon, glass, aramid, and poly(p-phenylene-2,6-benzobisoxazole).

3. A toothed belt as set forth in claim 2 wherein said belt possesses an optical belt pitch line differential in the range of from 0.85 mm to about 1.1 mm.

4. A toothed belt as set forth in claim 2 wherein said belt is engageable with a pulley having a design pitch line differential, and said belt pitch line differential is greater than said design pitch line differential by about 0.09 mm to about 0.51 mm.

5. A toothed belt as set forth in claim 1 wherein said at least one cord comprises carbon fiber, and said cord diameter is in the range from about 0.5 mm to about 0.95 mm.

6. A toothed belt as set forth in claim 1 wherein said at least one cord is made of a central carbon fiber core with a plurality of glass fibers disposed about said core.

7. A toothed belt as set forth in claim 1 wherein said at least one cord is of a carbon fiber construction selected from 12K-1, 6K-2, 3K-4, 6K-1, 3K-1, and 3K-2.

8. A toothed belt as set forth in claim 1 wherein said jacket has a compressed thickness of from about 0.57 mm to about 0.75 mm.

9. A toothed belt as set forth in claim 1 wherein said cord diameter is greater than 0.85 mm, or said ratio of said cord diameter to said jacket thickness is less than about 1.5, or both.

10. A toothed belt as set forth in claim 9 wherein the cord comprises a fiber material selected from carbon, poly(p-phenylene-2,6-benzobisoxazole), aramid, glass, high-strength glass, and a hybrid of the foregoing.

11. A toothed belt as set forth in claim 1 wherein the ratio of said cord diameter to said jacket thickness is less than about 1.5.

12. A toothed belt as set forth in claim 11 wherein the cord comprises a fiber material selected from carbon, poly(p-phenylene-2,6-benzobisoxazole), aramid, glass, high-strength glass, and a hybrid of the foregoing.

13. A synchronous drive assembly having a predetermined design pitch line differential and comprising at least a driver and a driven pulley, and a toothed belt in driving engagement with said pulleys; said toothed belt comprising:
   an elastomeric belt body;
   a tensile cord having a diameter;
   a jacket comprising fabric and having a compressed thickness; and
   a belt optical pitch line differential;
   wherein the ratio of the belt pitch line differential to the design pitch line differential is in the range of from about 1.2 to about 1.75; and
   the ratio of the cord diameter to the jacket thickness is in the range of from about 0.7 to about 1.7.

14. A synchronous drive assembly as set forth in claim 13 wherein the ratio of the belt pitch line differential to the design pitch line differential is in the range of from 1.24 to about 1.75; and
   the ratio of the cord diameter to the jacket thickness is in the range of from about 0.7 to less than about 1.5.

15. A synchronous drive assembly as set forth in claim 14 wherein the ratio of the belt pitch line differential to the design pitch line differential is in the range of from 1.24 to about 1.6; and
   the ratio of the cord diameter to the jacket thickness is in the range of from about 1.0 to less than about 1.5.

16. A synchronous drive assembly as set forth in claim 14 wherein the cord comprises a fiber material selected from carbon, poly(p-phenylene-2,6-benzobisoxazole), aramid, glass, high-strength glass, and a hybrid of the foregoing.

17. A synchronous drive assembly as set forth in claim 13 wherein the cord comprises a fiber material selected from carbon, poly(p-phenylene-2,6-benzobisoxazole), and a hybrid of at least two selected from carbon, glass, aramid, and poly(p-phenylene-2,6-benzobisoxazole).

18. A synchronous drive assembly as set forth in claim 13 wherein the cord comprises carbon fiber, and the cord has a carbon fiber filament count of from about 1K to about 48K.

19. The belt of claim 1 wherein said jacket comprises exactly one fabric layer and said cord diameter is less than 0.95 mm.

20. The belt of claim 19 wherein the cord is a carbon fiber cord of 6k construction.

21. The belt of claim 20 wherein the cord diameter is about 0.75 mm, and the compressed thickness of the jacket is about 0.6 mm.

22. A toothed belt comprising:
   an elastomeric body;
   at least two teeth formed of said body and having a nominal tooth pitch of about 9.525 mm;
   a jacket comprising fabric and disposed along a peripheral surface of said at least one tooth and having a compressed jacket thickness in the range from 0.57 mm to about 0.7 mm; and
   at least one cord embedded in said body and having a cord diameter in the range from 0.6 mm to about 0.8 mm.

23. The belt of claim 22 wherein the cord is a carbon fiber cord of 6k construction and the cord diameter is about 0.75 mm.

24. The synchronous drive assembly of claim 15 wherein the design pitch line differential is about 0.686 mm, the cord is a carbon fiber cord of 6k construction with a cord diameter of about 0.75 mm, and the compressed thickness of the jacket is about 0.6 mm.

* * * * *